United States Patent
Osawa

(10) Patent No.: US 11,564,203 B2
(45) Date of Patent: Jan. 24, 2023

(54) USER TERMINAL AND RADIO COMMUNICATION METHOD

(71) Applicant: NTT DOCOMO, INC., Tokyo (JP)

(72) Inventor: Ryosuke Osawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/637,911

(22) PCT Filed: Aug. 18, 2017

(86) PCT No.: PCT/JP2017/029666
§ 371 (c)(1),
(2) Date: Feb. 10, 2020

(87) PCT Pub. No.: WO2019/035213
PCT Pub. Date: Feb. 21, 2019

(65) Prior Publication Data
US 2020/0221422 A1    Jul. 9, 2020

(51) Int. Cl.
*H04W 4/00* (2018.01)
*H04W 72/02* (2009.01)
*H04W 52/36* (2009.01)

(52) U.S. Cl.
CPC ......... *H04W 72/02* (2013.01); *H04W 52/365* (2013.01)

(58) Field of Classification Search
CPC ............. H04W 72/0473; H04W 52/18; H04W 52/383; H04W 76/14
USPC ......................................... 370/328, 329, 330
See application file for complete search history.

(56) References Cited

U.S. PATENT DOCUMENTS

| 2011/0039568 | A1  | 2/2011  | Zhang et al. |
| 2015/0327180 | A1* | 11/2015 | Ryu ................... H04W 72/0473 370/329 |
| 2018/0183551 | A1* | 6/2018  | Chou .................... H04L 5/0042 |
| 2018/0368117 | A1* | 12/2018 | Ying .................... H04L 5/0044 |
| 2019/0053211 | A1* | 2/2019  | Ying .................... H04W 72/044 |
| 2019/0150170 | A1* | 5/2019  | Park ..................... H04W 74/08 370/329 |

(Continued)

FOREIGN PATENT DOCUMENTS

| AU | 2009282047 A1 * | 2/2011 | ............ H04W 28/04 |
| JP | 2013-502163 A | 1/2013 | |

OTHER PUBLICATIONS

International Search Report issued in Application No. PCT/JP2017/029666, dated Nov. 7, 2017 (5 pages).

(Continued)

*Primary Examiner* — David Q Nguyen
(74) *Attorney, Agent, or Firm* — Osha Bergman Watanabe & Burton LLP

(57) ABSTRACT

A user terminal according to one aspect of the present disclosure includes: a transmitting section that performs uplink (UL) data transmission, independently of a UL transmission indication from a radio base station; a receiving section that receives information of a plurality of candidates, regarding a value of a parameter used for the UL data transmission; and a control section that determines application of a value determined based on the information of the plurality of candidates to the UL data transmission. According to one aspect of the present disclosure, communication throughput reduction and so on can be prevented even when UL grant-free transmission is performed.

5 Claims, 8 Drawing Sheets

(56) References Cited

U.S. PATENT DOCUMENTS

| | | | |
|---|---|---|---|
| 2020/0127787 A1* | 4/2020 | Nory | H04L 27/2613 |
| 2020/0196343 A1* | 6/2020 | Marinier | H04L 5/0092 |
| 2020/0213057 A1* | 7/2020 | Bala | H04L 27/2636 |
| 2020/0252917 A1* | 8/2020 | Zhang | H04W 72/042 |
| 2020/0288412 A1* | 9/2020 | Ajdakple | H04W 80/02 |

OTHER PUBLICATIONS

Written Opinion issued in International Application No. PCT/JP2017/029666, dated Nov. 7, 2017 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG-RAN WG1 Meeting #89; R1-1709126; "Uplink Grant Free Transmission for URLLC;" Institute for Information Industry (III); May 15-19, 2017; Hangzhou, P.R. China (4 pages).

\* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In the existing LTE systems (for example, LTE Rel. 8 to Rel. 13), communication of a downlink (DL) and/or an uplink (UL) is performed by using a subframe of 1 ms (also referred to as a transmission time interval (TTI) or the like). The subframe is a transmission time unit of one data packet coded by channel coding, and is a processing unit of scheduling, link adaptation, retransmission control (HARQ (Hybrid Automatic Repeat reQuest)), and so on.

A radio base station (for example, an eNB (eNodeB)) controls allocation (scheduling) of data for a user terminal (UE (User Equipment)), and notifies the UE of a scheduling indication of data by using downlink control information (DCI). For example, when receiving DCI (also referred to as a UL grant) indicating UL transmission, the UE in compliance with existing LTE (for example, LTE Rel. 8 to Rel. 13) performs UL data transmission in a subframe after a certain period (for example, after 4 ms).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), it is assumed that scheduling of data is controlled by using a configuration different from that used in the existing LTE systems. For example, to provide communication services requiring low latency and high reliability (for example, URLLC (Ultra Reliable and Low Latency Communications)), communication latency reduction is under study.

Specifically, to reduce latency before start of UL data transmission, communication allowing contention of UL transmissions of a plurality of UEs is under study. For example, UL data transmission (also referred to as UL grant-free (GF) transmission, UL grant-less transmission, contention-based UL transmission, and so on), in which the UE does not depend on a UL grant from a radio base station, is under study.

Control of performing GF transmission based on fixed values of parameters necessary for GF transmission, which are notified in advance from a base station, is under study. However, such GF transmission based on fixed values notified from a base station may become inappropriate in some cases, due to variation of state of propagation path, transmission power limitation, and so on. GF control methods studied thus far may not be capable of enabling flexible control, and thus communication throughput, spectral efficiency, and so on may be deteriorated.

In view of this, the present disclosure has one object to provide a user terminal and a radio communication method that can prevent communication throughput reduction and so on even when UL grant-free transmission is performed.

Solution to Problem

A user terminal according to one aspect of the present disclosure includes: a transmitting section that performs uplink (UL) data transmission, independently of a UL transmission indication from a radio base station; a receiving section that receives information of a plurality of candidates, regarding a value of a parameter used for the UL data transmission; and a control section that determines application of a value determined based on the information of the plurality of candidates to the UL data transmission.

Advantageous Effects of Invention

According to one aspect of the present disclosure, communication throughput reduction and so on can be prevented even when UL grant-free transmission is performed.

DESCRIPTION OF EMBODIMENTS

Figure 1:
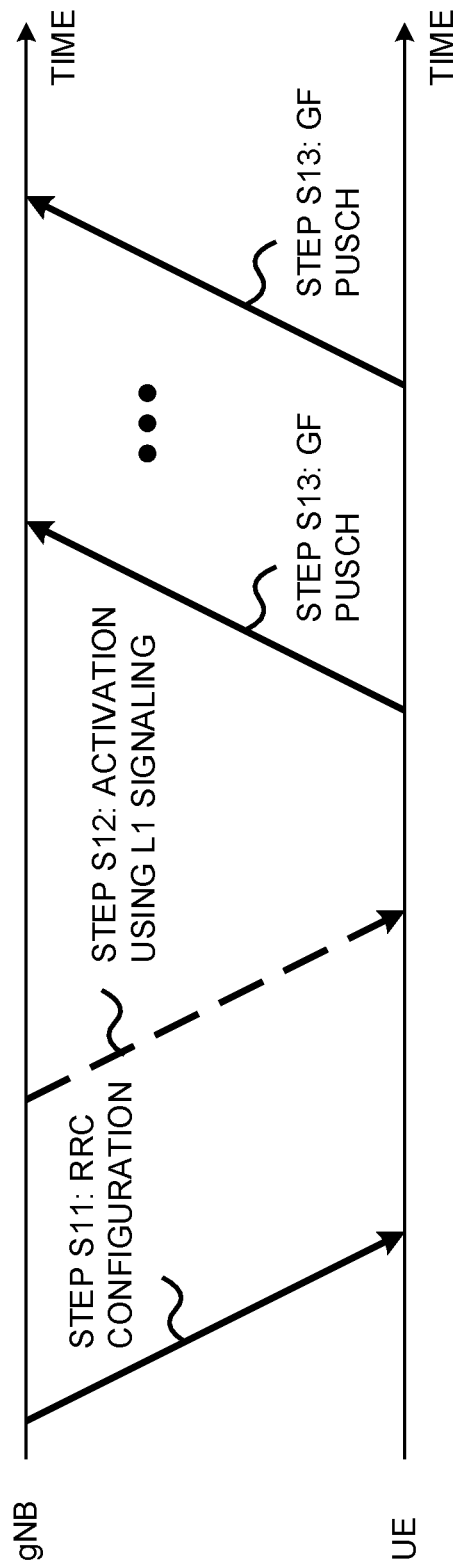
FIG. 1 is a diagram to show an example of a sequence of control of GF transmission.

For NR, to implement low latency communications, application of UL grant-free transmission in which UL data is transmitted without a UL grant is under study, as well as UL grant-based transmission in which UL data is transmitted based on a UL grant.

In UL grant-based transmission, a radio base station (which may be, for example, referred to as a BS (Base Station), a transmission/reception point (TRP), an eNB (eNodeB), a gNB (NR NodeB), and so on) transmits a downlink control channel (UL grant) indicating allocation of UL data (PUSCH (Physical Uplink Shared Channel)), and a UE transmits UL data in accordance with the UL grant.

On the other hand, in UL grant-free transmission, a UE transmits UL data, without receiving a UL grant for scheduling data. UL grant-free is hereinafter also simply referred to as ULGF, GF PUSCH, GF, and so on.

Physical layer (L1: Layer 1) signaling (for example, a PDCCH (Physical Downlink Control Channel)) for activating GF transmission is also under study. Several types of control of GF transmission are under study. For example, in type 1, GF transmission is based only on RRC (Radio Resource Control) configuration, and does not use L1 signaling.

In type 2, GF transmission is based on both of RRC configuration and activation/deactivation using L1 signaling.

In type 3, GF transmission may be based on RRC configuration, and configured parameters can be modified (overwritten) using L1 signaling. Note that GF transmission is not limited to these types. Some of the types (for example, types 2 and 3) may be used together.

RRC configuration related to GF may be referred to as GF configuration. In one carrier, the UE may support only one GF configuration, or may support more than one GF configuration. Note that the GF configuration may be referred to as GF transmission configuration and so on.

In the GF configuration, parameters used for GF transmission (which may be referred to as GF transmission parameters, GF parameters, and so on) are determined.

The GF parameters may include information of a numerology. The numerology may be a communication parameter applied to transmission and/or reception of a certain signal and/or channel, and may indicate, for example, at least one of a sub-carrier spacing (SCS), a bandwidth, a symbol length, a cyclic prefix length, a TTI length (for example, a subframe length and a slot length), the number of symbols for each TTI, a radio frame configuration, a filtering process, a windowing process, and so on.

The GF parameters may include information of a waveform. The information of a waveform may be information for specifying a cyclic prefix OFDM (CP-OFDM (Cyclic Prefix Orthogonal Frequency Division Multiplexing))-based waveform, a DFT spread OFDM (DFT-S-OFDM (Discrete Fourier Transform Spread Orthogonal Frequency Division Multiplexing))-based waveform, and so on.

The GF parameters may include: a parameter related to code word (CW, codeword) mapping; a parameter related to time and/or frequency resources (the number of symbols, the number of resource blocks (RBs), and so on); a modulation and coding scheme (MCS), a new data indicator (NDI), a redundancy version (RV), a HARQ process number (HPN), the number of HARQ processes, and certain identifiers (for example, a network temporary identifier (RNTI (Radio Network Temporary Identifier))); a parameter related to transmission power ($P_{o\_PUSCH}$, $\alpha$, and so on); a parameter related to repetition of GF transmission; and so on.

The GF parameters may include a parameter related to any reference signal (which may be referred to as an RS parameter) (for example, a demodulation reference signal (DMRS) for GF transmission).

The GF parameters may include a beam index (BI), a rank indicator (RI), a precoding matrix indicator (PMI), a TRI (Transmitted RI), a TPMI (Transmitted PMI), a certain reference signal port index (for example, a DMRS port index (DPI) and an SRS port index (SPI)), a certain reference signal resource indicator (for example, a CSI-RS resource indicator (CRI), a DMRS resource index (DRI), and an SRS resource index (SRI)), QCL (Quasi-Co-Location) information, beam pair link (BPL) information, and so on.

FIG. 1 is a diagram to show an example of a sequence of control of GF transmission. In Step S11, the gNB performs RRC configuration (GF configuration) for the UE. In Step S12, the gNB performs activation using L1 signaling for the UE. The L1 signaling may include information (parameter update information) for updating values of parameters of the RRC configuration. When GF transmission of type 1 is used, Step S12 is omitted.

In Step S13, the UE performs GF PUSCH transmission, based on the GF configuration of Step S11 (and the parameter update information of Step S12). When GF transmission of type(s) 2 and/or 3 is used, L1 signaling indicating deactivation of the GF transmission and/or the parameter update information may be notified to the UE.

In this manner, the UE performs GF transmission, based on RRC configuration and/or L1 signaling notified in advance from the base station. However, such GF transmission based on configured or updated parameters may become inappropriate in some cases, due to variation of state of propagation path, transmission power limitation, and so on.

For example, it may be assumed that a satisfactory SINR (Signal to Interference plus Noise Ratio) is not obtained with an MCS indicated by a base station, satisfactory power density is not obtained with indicated frequency resources (for example, a certain number of RBs), and so on.

If the UE is given the capability of entirely freely modifying the GF parameters, however, the base station needs to perform blind detection for all assumable combinations of the GF parameters, which is not practical.

From the above description, GF control methods studied thus far may not be capable of enabling flexible control, and thus communication throughput, spectral efficiency, and so on may be deteriorated.

In view of this, the inventor of the present invention comes up with a configuration in which a restriction on modification of GF parameters is placed for a UE, so that the UE can autonomously modify the GF parameters under the restriction.

Embodiments according to the present disclosure will be described in detail with reference to the drawings as follows. A radio communication method according to each embodiment may be employed independently or may be employed in combination.

Note that, in the following embodiments, a prefix "NR-" indicating the meaning of "for NR" may be added to any signal and channel, so that the signal and channel may be interpreted as such meaning.

Further, the parameter (which may be referred to as a radio parameter, configuration information, and so on) may mean a "parameter set" indicating one or more sets of parameters.

(Radio Communication Method)

In one embodiment, the gNB may configure, for the UE, a plurality of candidates of a part or all of GF parameters. The "plurality of candidates" may be herein interpreted as variable values, a variable value range, a plurality of possible values, and so on. A parameter for which variable values are configured may be referred to as a variable parameter. Information related to the plurality of candidates may be referred to as variable parameter information.

The variable parameter information may be configured (indicated) by the gNB by using higher layer signaling (for example, RRC signaling, broadcast information (master information blocks (MIBs), system information blocks (SIBs), and so on), and MAC (Medium Access Control) signaling), physical layer signaling (for example, DCI), or a combination of these, or may be defined in a specification.

The variable parameter information may indicate a plurality of values for a specific GF parameter. For example, the variable parameter information may include information indicating MCS=20 and 21.

The variable parameter information may indicate a variable value range for a specific GF parameter. For example, the variable parameter information may include information indicating MCS=20 to 28.

The variable parameter information may indicate a default value of a parameter for which a plurality of candidates are configured. For example, the variable parameter information may include information indicating 20 as a default value of the MCS.

Even when a default value of a variable parameter is not explicitly configured, the UE may use any of the configured candidates as the default value. The default value may be defined in a specification.

Note that the MCS is used as an example of the variable parameter. However, a plurality of candidates may be configured for other parameters, such as a TRI, a waveform, a numerology, a beam, and a BPL.

For the UE, a combination of a plurality of variable parameters (which may be referred to as a parameter set, a variable parameter set, and so on) may be configured. For example, parameter set 1 indicating {MCS=20, TRI=2, TPMI=2, Waveform=CP-OFDM}, parameter set 2 indicating {MCS=18, TRI=1, TPMI=0, Waveform=DFT-S-OFDM}, or the like may be configured for the UE. Information related to the plurality of candidates may include information indicating one or more parameter sets.

A plurality of values or a variable value range may be specified for a part or all of the parameters included in a parameter set. For example, parameter set 3 indicating {MCS=20 to 28, TRI=2, TPMI=0, Waveform=CP-OFDM} may be configured for the UE.

Note that the parameter set may be associated with a certain index (which may be, for example, referred to as a parameter set index, a parameter set ID, and so on). Further, a default value may be configured for a parameter included in a parameter set.

For each of the variable parameters, the UE actively (autonomously) selects (determines) an appropriate value out of configured candidates, and performs GF transmission by using the value.

The UE may report, to the gNB, information related to the parameter or the parameter set used for GF transmission. The information may be referred to as use parameter information, or the like.

For example, the use parameter information may be notified to the gNB, using higher layer signaling (RRC signaling, MAC signaling), L1 signaling (for example, uplink control information (UCI)), or a combination of these.

The UE may report the use parameter information on GF transmission (GF PUSCH), or may report the use parameter information on another channel that is different from the channel for GF transmission (UL grant-based PUSCH, PUCCH, and so on).

In the former case, other channels are not used, and therefore control can be simplified. For example, in the transmission of use parameter information in GF transmission, the UE may perform a transmission process (modulation and so on) by using a certain value (for example, a default value) as a value of the variable parameter. The gNB can perform a receiving process (demodulation and so on) of the use parameter information included in the GF transmission, assuming the certain value. Further, the gNB can perform a receiving process of the remaining part included in the GF transmission, based on the use parameter information.

On the other hand, in the latter case, use parameter information need not be included in GF transmission, and therefore reduction of the data amount of GF transmission can be suppressed.

The UE need not include, in use parameter information, information of all the parameters used for GF transmission. The UE may include only information of variable parameter(s) in use parameter information, and may report the use parameter information. For example, when only the MCS is a variable parameter, the UE reports a value of the used MCS, and need not report values of the other parameters.

When a default value is used despite the presence of a variable parameter, the UE need not report information of the parameter. The UE may include, in the use parameter information, information indicating that a default value is to be used for one or more variable parameters.

In the use parameter information, a specific parameter may indicate an absolute value, or indicate a relative value with respect to the last reported value or a certain reference value. In the use parameter information, a specific parameter may indicate an index associated with a value. For example, when MCS=20 to 27 is configured for the UE, index #i (i=0 to 7) may be associated with MCS=20+i. Correspondence between a value and an index may be notified using higher layer signaling and so on, or may be determined based on a certain rule (for example, a value obtained by subtracting a minimum value is assumed to be an index).

The gNB may perform a receiving process (for example, decoding) of resources for GF transmission, assuming default value(s) of one or more variable parameters configured for the UE. The gNB may perform a receiving process of the resources for GF transmission, assuming the last reported value(s) from the UE about the use parameter information as one or more variable parameters configured for the UE.

The UE may perform control of reporting the use parameter information when a value of a specific variable parameter changes from the last reported value by more than a certain value, and otherwise, not reporting the use parameter information. Information of the certain value may be included in configuration information of a variable parameter or a variable parameter set so as to be notified to the UE, or may be defined in a specification.

The certain value may be an absolute value, may be a relative value with respect to the last reported value or a certain reference value, or a plurality of values (an upper limit, a lower limit, and so on) may be configured for one parameter. According to the configuration as described above, the base station can perform a receiving process of the GF PUSCH, assuming that a value of a specific variable parameter is determined within a certain value from the value last reported in the use parameter information.

Information of a used parameter set may be a parameter set ID.

Information of a parameter and information of a parameter set may be notified in combination. For example, when parameter set 3 (assume that ID=3) described above is configured, the UE may report ID=3 as the information of a parameter set. Further, to specify a value of the MCS being a variable parameter, the UE may report MCS=22 as the information of a parameter.

Figure 2:
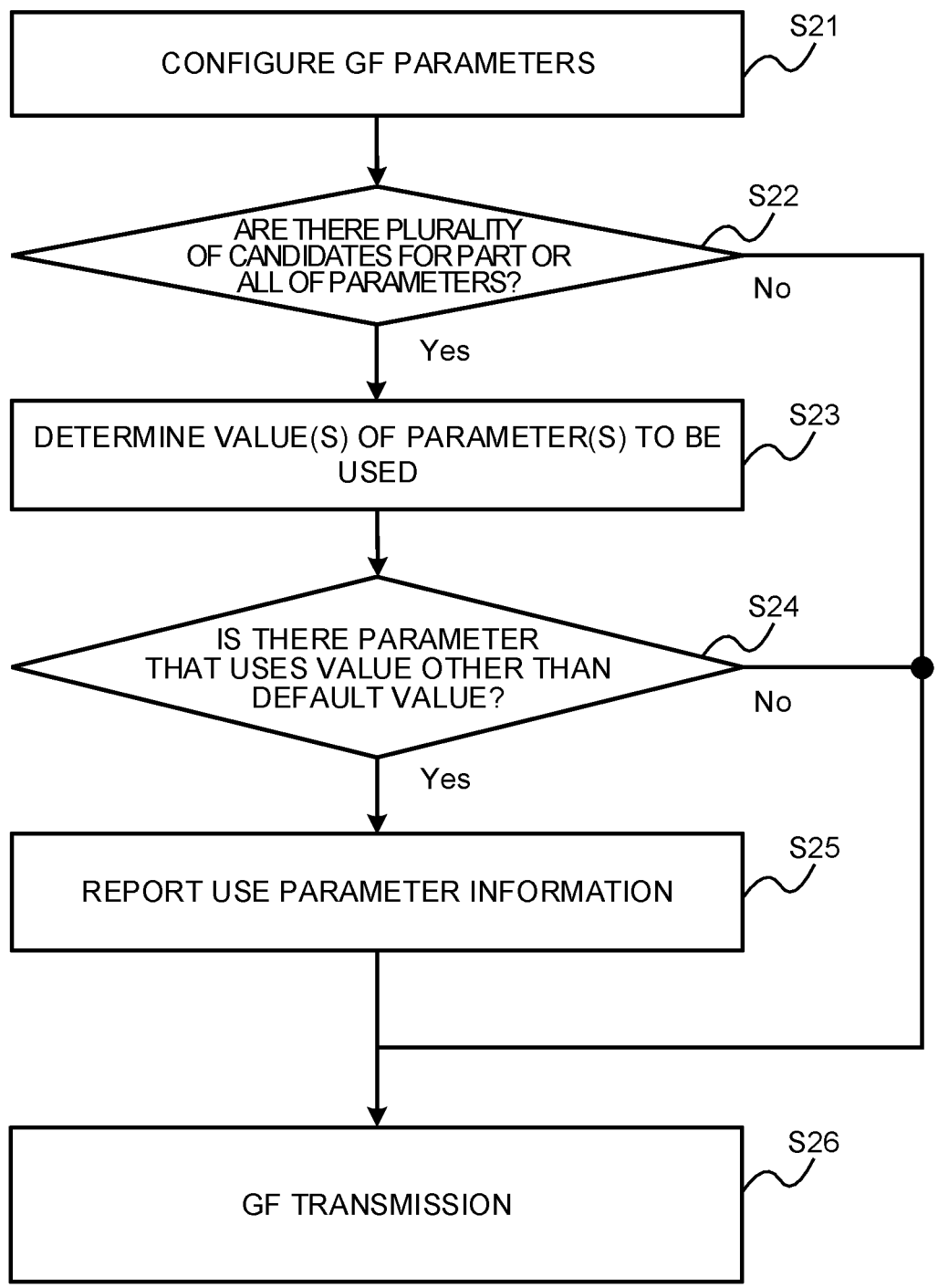
FIG. 2 is a diagram to show an example of flowchart of GF parameter configuration and reporting according to one embodiment.

FIG. 2 is a diagram to show an example of a flowchart of GF parameter configuration and reporting according to one embodiment. In Step S21, for the UE, for example, GF parameters (a fixed value or variable value of each of the GF parameters, and so on) are configured, for example, by using higher layer signaling.

In Step S22, the UE determines whether or not there are a plurality of candidates for a part or all of the configured GF parameters (whether or not a part or all of the GF parameters are variable parameters).

When variable parameter(s) is configured (Step S22—Yes), in Step S23, the UE determines value(s) to be used for the parameter(s). Here, the UE may determine the value(s) to be used, based on signaling and so on from the gNB that is obtained as a result of measuring a certain signal (for example, a reference signal).

Next, in Step S24, the UE determines whether or not there is a variable parameter that uses a value other than a default value.

When there is a variable parameter that uses a value other than a default value (Step S24—Yes), in Step S25, the UE reports use parameter information. Note that the reporting may be performed in GF transmission of Step S26 described below, or may be performed separately from the GF transmission.

In Step S26, the UE performs GF transmission. When no variable parameters are configured (Step S22-No), the GF transmission is performed based on the parameters having a fixed value (fixed parameters) configured in Step S21.

When the process of Step S23 is performed, the GF transmission is performed by using the value(s) of the variable parameter(s) determined in Step S23 and the fixed parameters. Note that, when there are no variable parameters that use a value other than a default value, i.e., when all the variable parameters use a default value (Step S24-No), the GF transmission is performed by using the default values of the variable parameters configured in Step S21 and the fixed parameters.

According to the embodiment described above, for example, even when initially configured parameter values become inappropriate due to variation of propagation path, adaptive control in which the UE can autonomously determine GF parameters (UE-centric determination) is enabled.

Owing to the configuration in which the UE transmits a report (use parameter information) autonomously determined (modified) by the UE, the gNB no longer needs to perform blind detection for a great number of combinations of GF parameter values. Even when such a report is omitted, the gNB only needs to perform blind detection for parameter values within a limited range. As a result, increase in a load of the gNB can be prevented.

<Variations>

[Control Related to PHR]

To the gNB, the UE may feed back a power headroom report (PHR) including information related to uplink power headroom (PH) assuming GF transmission using variable parameters.

The PHR may be transmitted using higher layer signaling (for example, MAC signaling), physical layer signaling (for example, UCI), or a combination of these.

The UE may transmit a PHR, in response to its active switching of value(s) of one or more variable parameters. In this case, the UE may transmit use parameter information at the same time as the PHR. For example, the UE may include, in MAC PDUs (Protocol Data Units), MAC signaling indicating a PHR (PHR MAC CEs (Control Elements)) and MAC signaling indicating use parameter information, and may transmit the MAC PDUs.

The UE may transmit a PHR assuming values different from currently used values of variable parameters. The UE may transmit a PHR including PH of respective values assuming a plurality of values of variable parameters.

The gNB may transmit a report indication of a PHR to the UE, in response to recognition (detection) of the fact that the UE has modified value(s) of one or more variable parameters. The modification of a value of a variable parameter may be determined based on use parameter information. According to the configuration described above, the gNB can know power headroom (PH) of GF transmission at an early stage.

The report indication may be transmitted using higher layer signaling (for example, RRC signaling and MAC signaling), physical layer signaling (for example, DCI), or a combination of these.

The gNB may transmit, to the UE, a report indication of a PHR assuming a specific value of a variable parameter. According to the configuration described above, even at time before the UE autonomously switches a value of a variable parameter, the gNB can acquire a PHR corresponding to the value after the switching. As a result, power control can be appropriately performed.

[Signaling Specifying Value of Variable Parameter]

The embodiment described above illustrates a case where the UE actively determines a value of a variable parameter, but this is not restrictive. The UE may receive information for specifying a value of a variable parameter (which may be referred to as variable parameter value specification information, specification information, and so on). When the UE receives the specification information, the UE may use a value indicated by the specification information, instead of actively determining a value of the variable parameter.

For example, when the gNB configures a certain parameter (for example, the MCS) as a variable parameter for the UE by using RRC signaling, the gNB may transmit the specification information (for example, information indicating a value of the MCS) by using higher layer signaling (for example, MAC signaling), physical layer signaling (for example, DCI), or a combination of these.

The variable parameter value specification information may be notified using other signaling (for example, other DCI) that is different from the information for specifying a value of a fixed parameter. For example, the information for specifying a value of a fixed parameter may be notified using DCI in a common search space, and the variable parameter value specification information may be notified using DCI in a UE-specific search space.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 3:
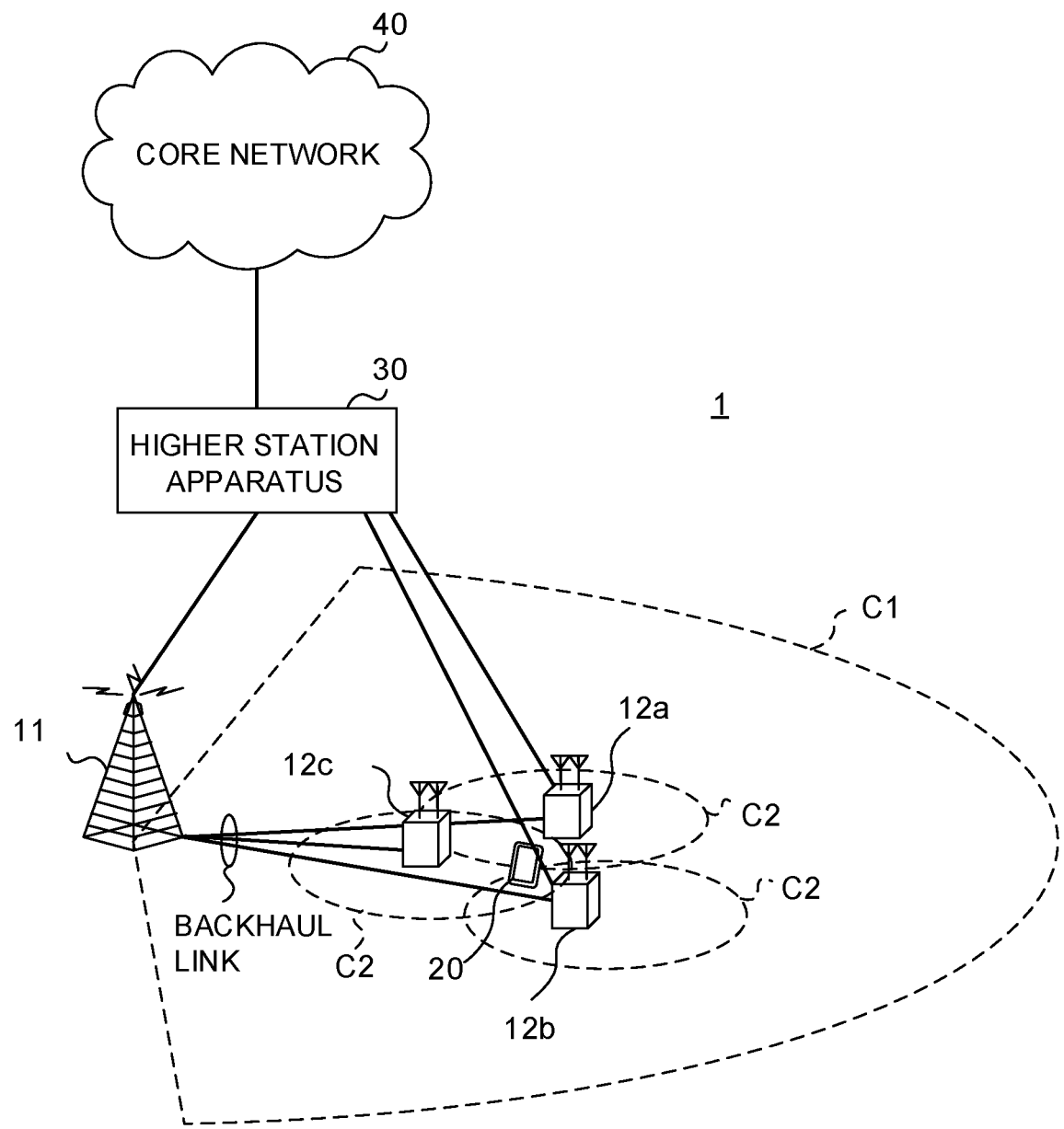
FIG. 3 is a diagram to show an example of a schematic structure of a radio communication system according to one embodiment.

FIG. 3 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

The numerology may be a communication parameter applied to transmission and/or reception of a certain signal and/or channel, and may indicate, for example, at least one of a sub-carrier spacing, a bandwidth, a symbol length, a cyclic prefix length, a subframe length, a TTI length, the number of symbols for each TTI, a radio frame configuration, a filtering process, a windowing process, and so on.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Delivery confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, delivery confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 4:
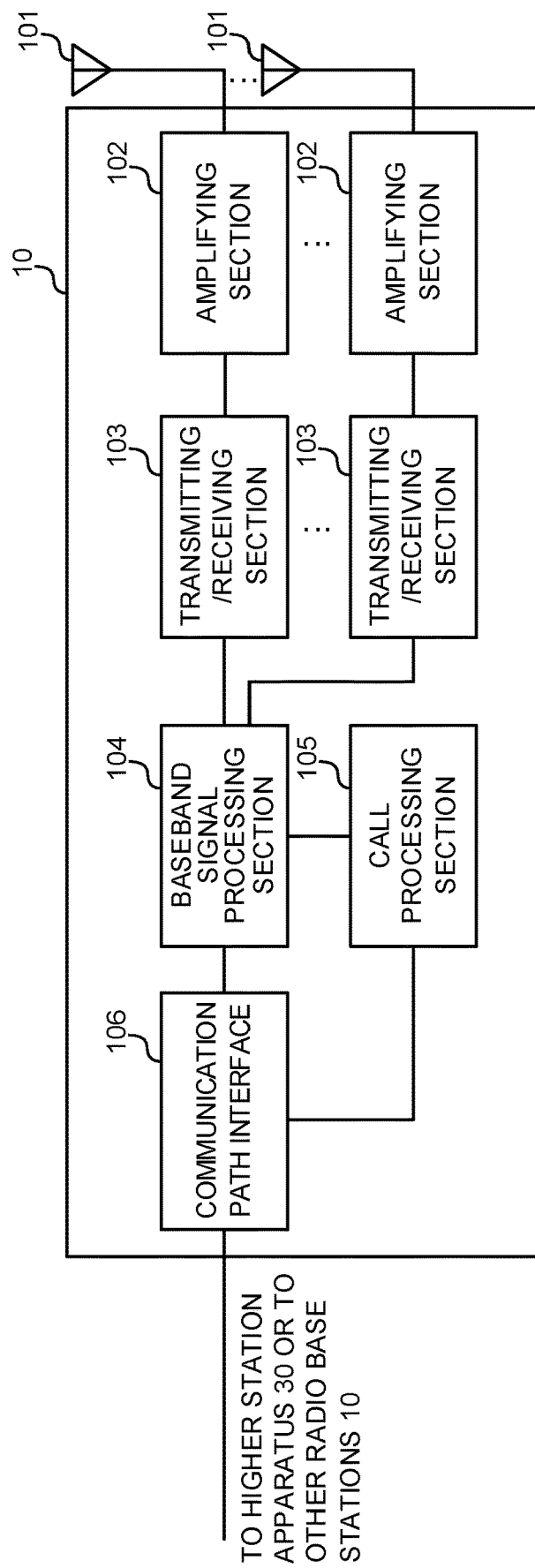
FIG. 4 is a diagram to show an example of an overall structure of a radio base station according to one embodiment.

FIG. 4 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 receive data transmitted from the user terminal 20, by means of GF transmission in which UL data is transmitted without a UL transmission indication (UL grant) from the radio base station 10. The transmitting/receiving sections 103 may receive use parameter information, a PHR, and so on from the user terminal 20.

The transmitting/receiving sections 103 may transmit, to the user terminal 20, GF configuration information, variable parameter information, variable parameter set information, and so on.

Figure 5:
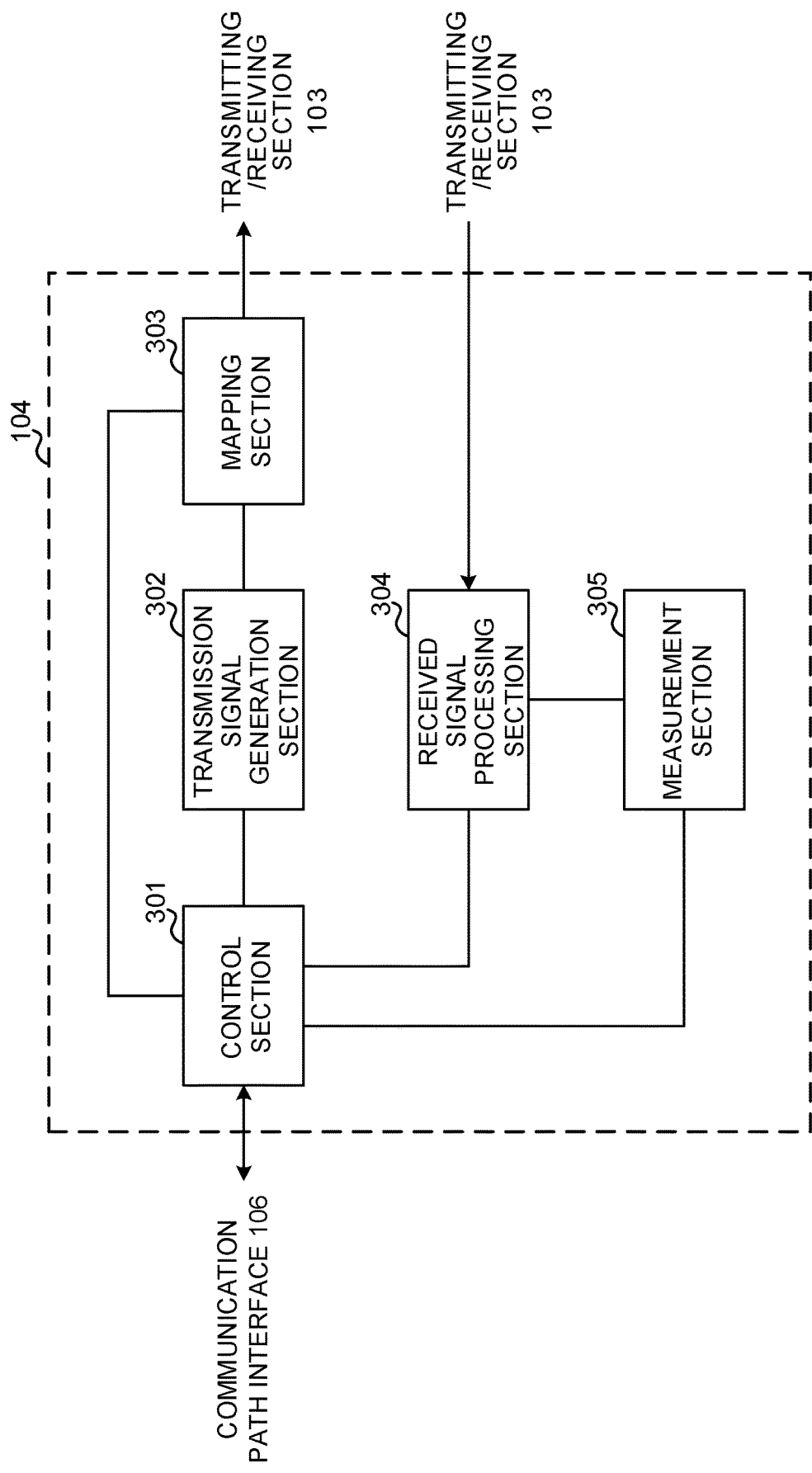
FIG. 5 is a diagram to show an example of a functional structure of the radio base station according to one embodiment.

FIG. 5 is a diagram to show an example of a functional structure of the radio base station according to one embodiment of the present disclosure. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, delivery confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, a PSS (Primary Synchronization Signal)/an SSS (Secondary Synchronization Signal)), a downlink reference signal (for example, a CRS, a CSI-RS, a DMRS), and so on.

The control section 301 controls scheduling of an uplink data signal (for example, a signal transmitted on a PUSCH), an uplink control signal (for example, a signal transmitted on a PUCCH and/or a PUSCH, delivery confirmation information, and so on), a random access preamble (for example, a signal transmitted on a PRACH), an uplink reference signal, and so on.

The control section 301 performs control of transmitting, to the user terminal 20, GF configuration for enabling application of GF transmission. The control section 301 may control a receiving process (decoding, demodulation, and so on) of GF transmission, which is transmitted from the user terminal 20, based on information of a plurality of candidates (variable parameter information) included in the GF configuration.

For example, the control section 301 may perform a receiving process (blind detection), assuming a plurality of values or a variable value range that corresponds to the variable parameter information of a specific parameter.

The control section 301 may perform transmit power control of a certain channel (a GF PUSCH, a grant-based PUSCH, and so on) of the user terminal 20, based on a PHR received from the user terminal 20.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), information of propagation path (for example, CSI), and so on. The measurement results may be output to the control section 301.

(User Terminal)

Figure 6:
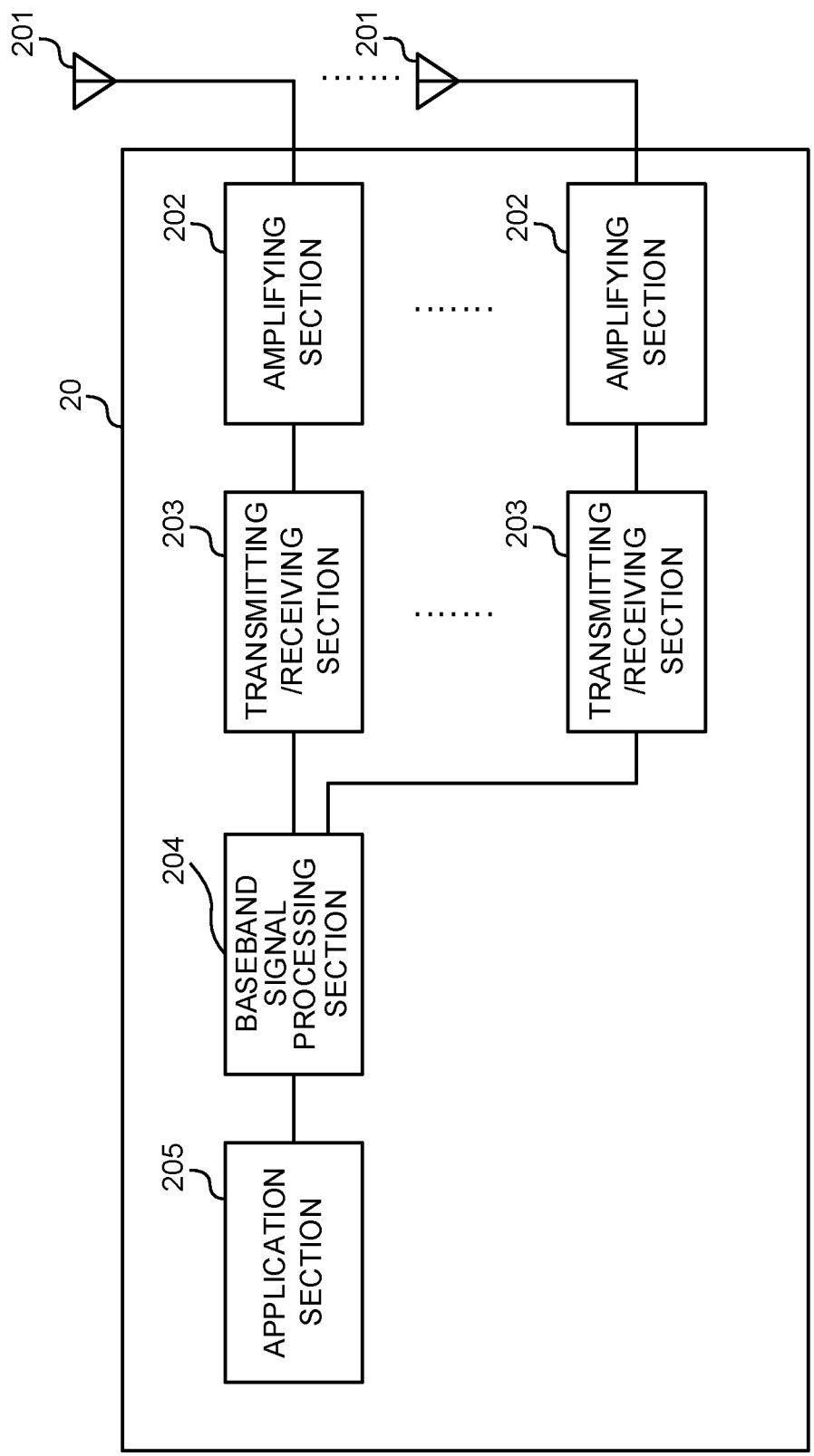
FIG. 6 is a diagram to show an example of an overall structure of a user terminal according to one embodiment.

FIG. 6 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 perform GF transmission of transmitting UL data without a UL transmission indication (UL grant) from the radio base station 10. The transmitting/receiving sections 203 may transmit use parameter information, a PHR, and so on to the radio base station 10.

The transmitting/receiving sections 203 may receive, from the radio base station 10, GF configuration information, variable parameter information, variable parameter set information, and so on.

Figure 7:
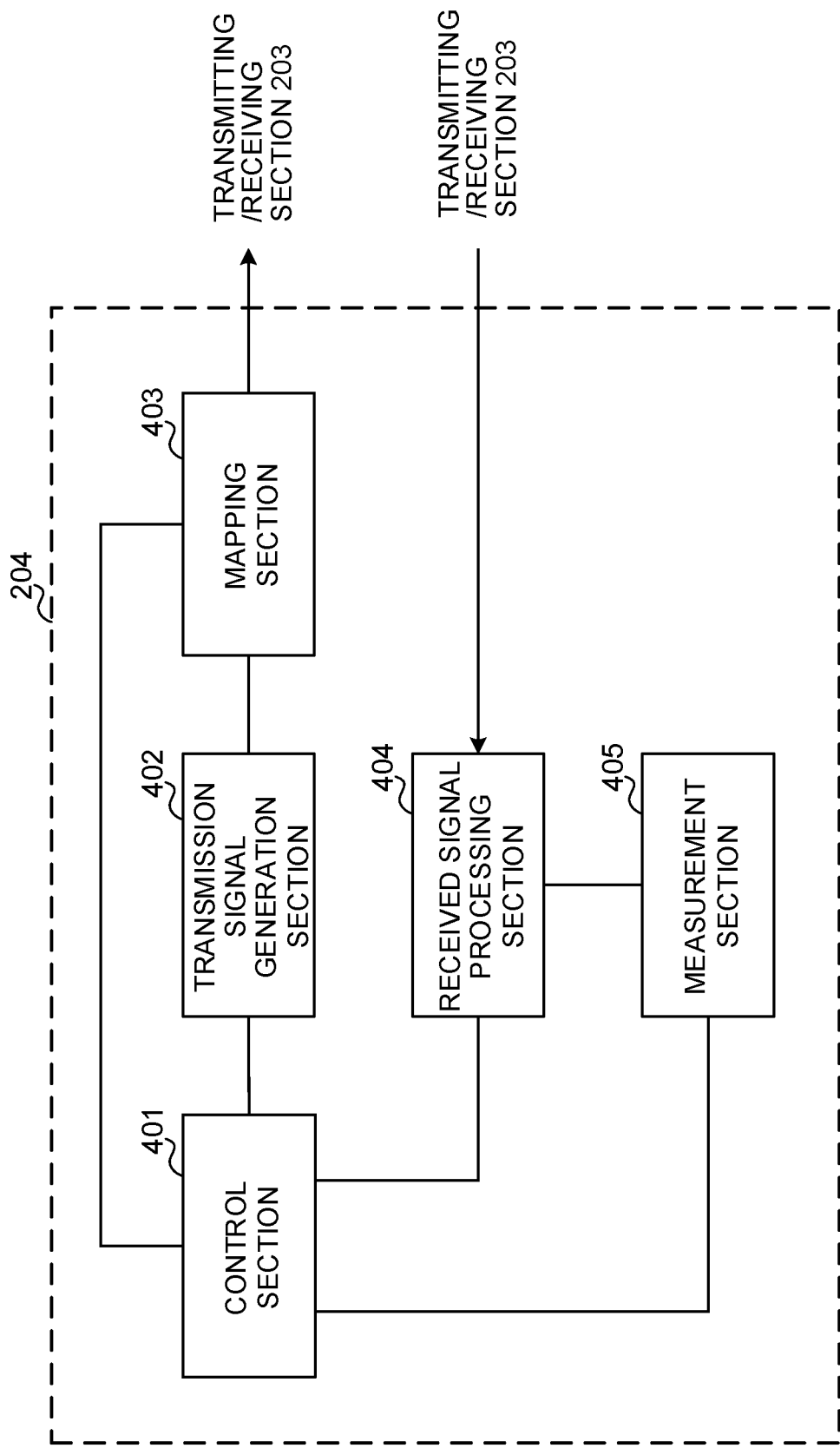
FIG. 7 is a diagram to show an example of a functional structure of the user terminal according to one embodiment.

FIG. 7 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 controls GF transmission, based on GF configuration (configuration for UL data transmission (GF transmission) independent of a UL transmission indication from the radio base station 10).

The GF configuration may include information of a plurality of candidates (variable parameter information) regarding a value of a parameter used for GF transmission. The control section 401 may determine application of a value determined based on the variable parameter information to GF transmission.

The variable parameter information may indicate a plurality of values or a variable value range. The variable parameter information may include information of a parameter set indicating a set of values of a plurality of parameters.

The control section 401 may perform control of transmitting a PHR assuming a value after modification, in response to a modification of a value of a parameter used for GF transmission.

When the control section 401 acquires, from the received signal processing section 404, various pieces of information notified from the radio base station 10, the control section 401 may update a parameter used for control, based on those pieces of information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), information of propagation path (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 8:
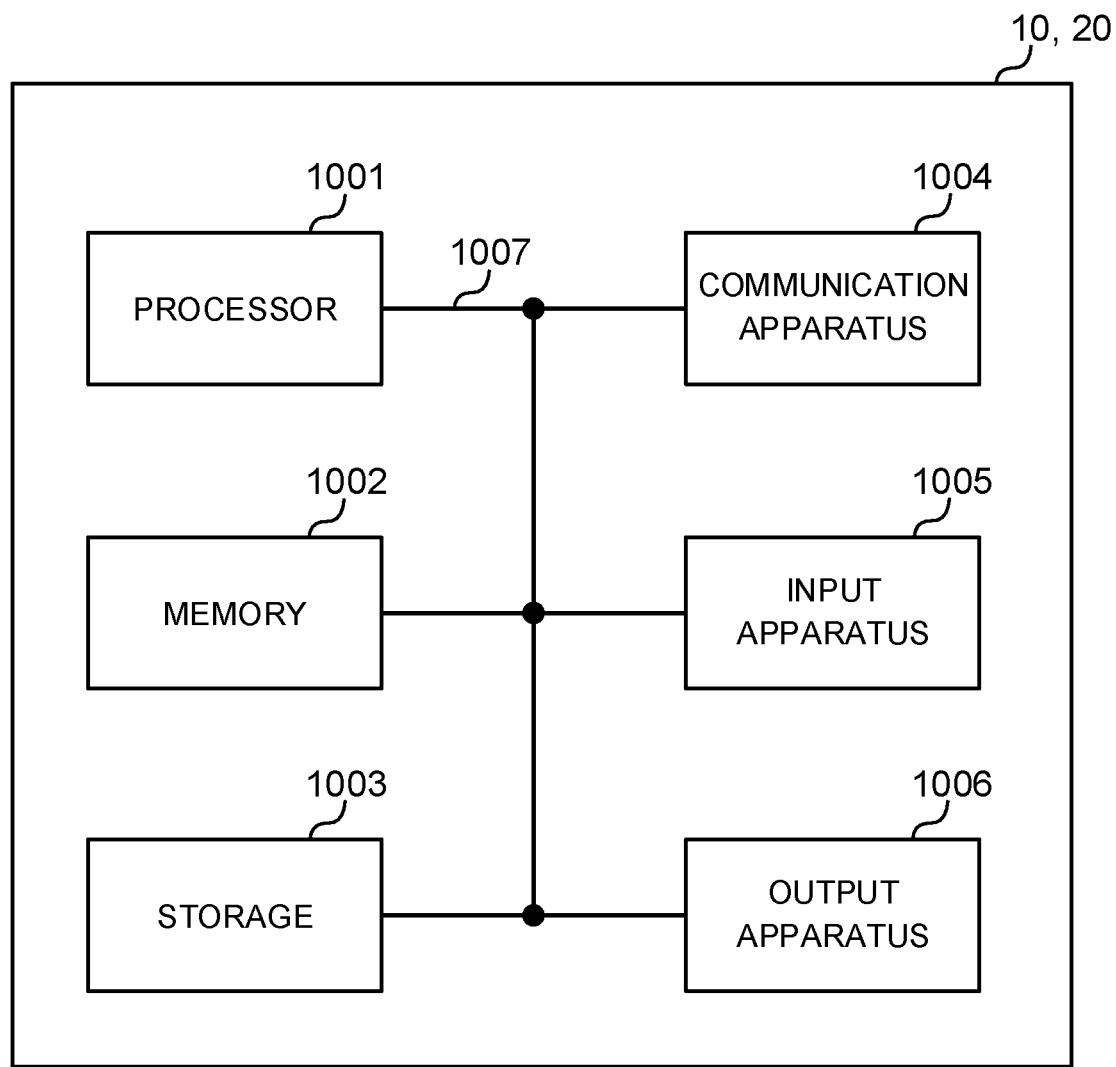
FIG. 8 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 8 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In this specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In this specification, the terms "mobile station (MS)," "user terminal," "user equipment (UE)," and "terminal" may be used interchangeably.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

The invention claimed is:

1. A terminal comprising:
    a receiver that receives Radio Resource Control (RRC) configuration including multiple configuration information used for Physical Uplink Shared Channel (PUSCH) transmission without reception of an uplink grant for scheduling; and
    a processor that controls the PUSCH transmission based on at least one of the multiple configuration information,
    wherein each of the multiple configuration information is a parameter set that includes waveform information and Modulation and Coding Scheme (MCS) information,
    wherein each of the multiple configuration information is associated with a certain parameter set index,
    wherein the waveform information, included in each of the multiple configuration information, indicates a DFT spread OFDM (DFT-S-OFDM) to the PUSCH of a plurality of types,
    wherein the plurality of types comprises a transmission of a type 1 based on the RRC configuration, and a transmission of a type 2 based on PDCCH, and
    wherein the processor determines a default value of the MCS information.

2. The terminal according to claim 1, wherein the processor autonomously determines information to apply to the PUSCH transmission among the multiple configuration information.

3. A radio communication method for a terminal comprising:
    receiving Radio Resource Control (RRC) configuration including multiple configuration information used for Physical Uplink Shared Channel (PUSCH) transmission without reception of an uplink grant for scheduling; and
    controlling the PUSCH transmission based on at least one of the multiple configuration information,
    wherein each of the multiple configuration information is a parameter set that includes waveform information and Modulation and Coding Scheme (MCS) information,
    wherein each of the multiple configuration information is associated with a certain parameter set index,
    wherein the waveform information, included in each of the multiple configuration information, indicates a DFT spread OFDM (DFT-S-OFDM) to the PUSCH of a plurality of types, wherein the plurality of types comprises a transmission of a type 1 based on the RRC configuration, and a transmission of a type 2 based on PDCCH, and wherein the radio communication method further comprises determining a default value of the MCS information.

4. A base station comprising:

a transmitter that transmits Radio Resource Control (RRC) configuration including multiple configuration information used for Physical Uplink Shared Channel (PUSCH) transmission without reception of an uplink grant for scheduling; and a processor that controls reception of a PUSCH that is transmitted based on at least one of the multiple configuration information, wherein each of the multiple configuration information is a parameter set that includes waveform information and Modulation and Coding Scheme (MCS) information, wherein each of the multiple configuration information is associated with a certain parameter set index, wherein the waveform information, included in each of the multiple configuration information, indicates a DFT spread OFDM (DFT-S-OFDM) to the PUSCH of a plurality of types, wherein the plurality of types comprises a transmission of a type 1 based on the RRC configuration, and a transmission of a type 2 based on PDCCH, and wherein a default value of the MCS information is determined by a terminal.

5. A system comprising: a base station and a terminal, wherein the base station comprises:

a transmitter that transmits Radio Resource Control (RRC) configuration including multiple configuration information used for Physical Uplink Shared Channel (PUSCH) transmission without reception of an uplink grant for scheduling; and a first processor that controls reception of a PUSCH that is transmitted based on at least one of the multiple configuration information, wherein the terminal comprises:

a receiver that receives the RRC configuration; and a second processor that controls the PUSCH transmission based on at least one of the multiple configuration information; and wherein each of the multiple configuration information is a parameter set that includes waveform information and Modulation and Coding Scheme (MCS) information, wherein each of the multiple configuration information is associated with a certain parameter set index, wherein the waveform information, included in each of the multiple configuration information, indicates a DFT spread OFDM (DFT-S-OFDM) to the PUSCH of a plurality of types, wherein the plurality of types comprises a transmission of a type 1 based on the RRC configuration, and a transmission of a type 2 based on PDCCH, and wherein the second processor determines a default value of the MCS information.

* * * * *